United States Patent Office 2,818,543
Patented Dec. 31, 1957

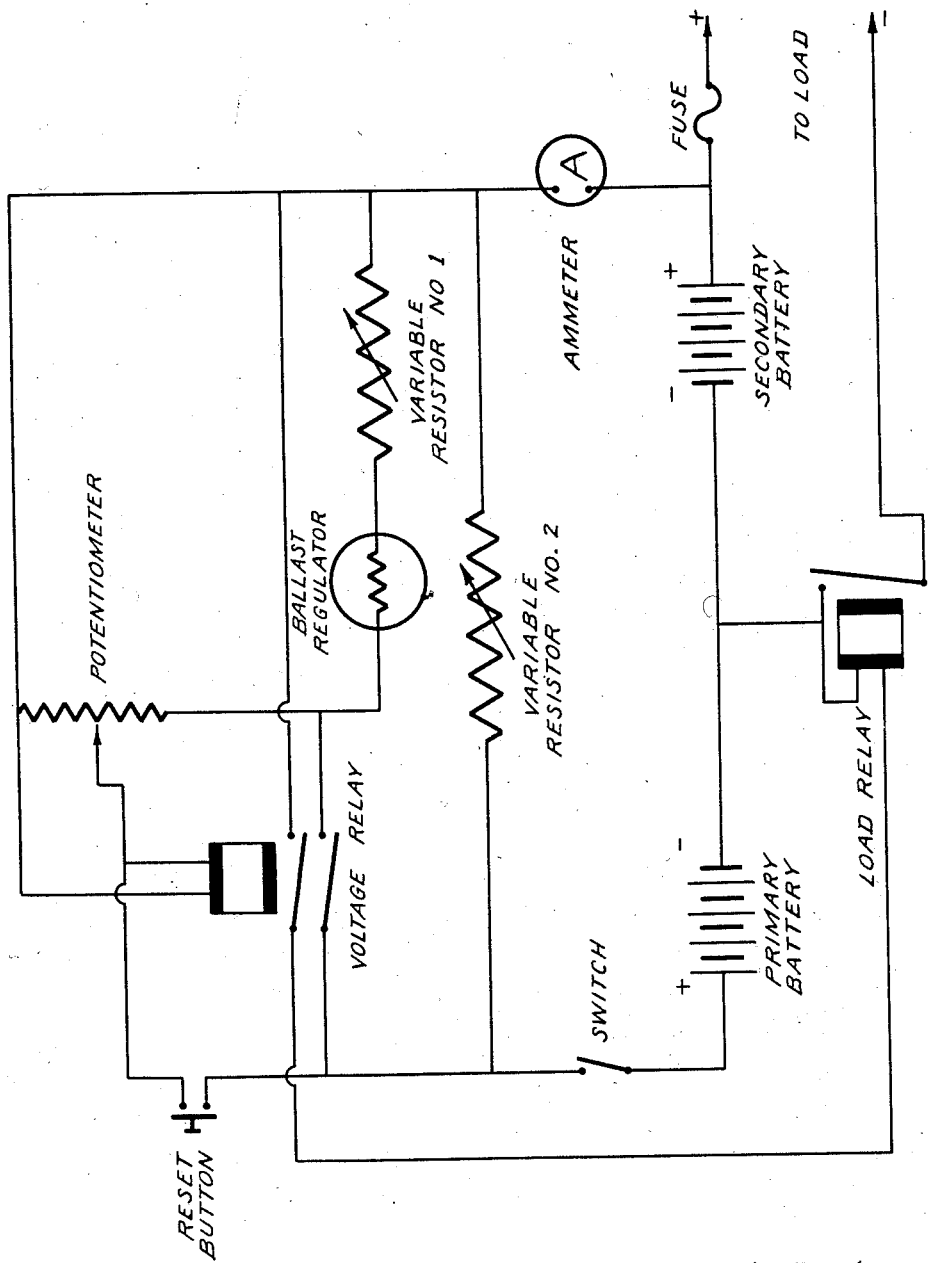

2,818,543

BATTERY POWER SUPPLY SYSTEM

Robert J. Dodge, Bellaire, Tex., assignor to The Light House, Inc., Houston, Tex., a corporation of Texas Application April 26, 1957, Serial No. 655,421

3 Claims. (Cl. 320—3)

The invention relates to a battery power supply system, and it concerns more particularly a battery power supply system which includes both primary and secondary type batteries, and in which the secondary battery cells are acted upon by the primary battery cells as necessary to maintain the secondary battery cells in fully charged condition.

An object of the invention is to provide a battery power supply system of the type described which is capable of supplying electric power intermittently, at time intervals of predetermined duration and spacing, at the high rates which are characteristic of the secondary battery cells and for long periods of time, which may be of the order of from one month to several years, for example, as determined by the capacity of the primary battery cells.

Another object of the invention is to provide such a system which is characterized by its dependability, and which may be safely operated unattended and is suitable for use in remote or isolated locations.

Electric power in the form of direct current is now available from several sources, as hereinafter described, each of which has certain limitations and none of which is well suited for operation unattended, and for long periods of time, in remote or isolated locations.

Generators necessarily must be driven by prime movers, which require a considerable amount of maintenance and attention to insure their continued operation.

Storage type batteries usually have a high rate of self discharge when not in use, so that the total useful capacity of the battery is dissipated in a relatively short time, which may be of the order of 30 days, for example. Special storage batteries having low rates of self discharge when not in use are usually characterized by correspondingly low rates of useful discharge. Thus a storage battery having the desired capacity and discharge rate may consist of a comparatively large number of heavy and expensive lead-acid or similar cells. Such batteries must be recharged at intervals, and for that purpose a generator or other source of direct current must be provided on the spot, or alternatively, the heavy cells must be removed to a location where such equipment is available.

Primary type batteries are characterized by low rates of self discharge when not in use, so that they do not deteriorate appreciably upon standing, but have correspondingly low rates of useful discharge. A comparatively large number of air depolarized zinc-caustic or similar cells must be used to obtain useful discharge rates. For example, a cell having a capacity of 2000 ampere hours may be limited to a maximum discharge rate of from 1 to 1.5 ampere. Discharges at greater rates tend to damage the cell. Thus 20 cells may be required in parallel, for example, to obtain a discharge rate of 20 amperes.

The invention contemplates a battery power supply system which includes both primary and secondary batteries, and which is capable of utilizing the large capacity, in terms of ampere hours per unit of volume, and the low self discharge rates when not in use, which are characteristic of the primary battery cells, as well as the high discharge rates of the secondary battery cells.

The invention further contemplates a novel and practical arrangement in which the primary and secondary batteries are combined in such a way that the advantageous features of both the primary and secondary battery cells are fully utilized.

The invention provides an arrangement in which the energy of the primary battery cells is stored in the secondary battery cells so that the energy can be released at rates much higher than the rates at which it can be released directly from the primary battery cells.

The invention includes means for transferring energy from the primary cells to the secondary battery cells.

The invention also includes means for limiting the rate of transfer of energy from the primary battery cells to the secondary battery cells so as not to exceed the discharge limitations of the primary battery cells.

The invention also includes means for limiting the rate of transfer of energy from the primary battery cells to the secondary battery cells so as not to produce harmful effects such as gasing in the secondary battery cells.

The invention further includes means for disconnecting the power supply from the load after the primary battery cells have become substantially spent, to thereby prevent complete discharge of the secondary battery cells for a considerable period of time.

The invention will be readily understood by referring to the following description and the accompanying drawing, the single figure of which is an electrical diagram of apparatus embodying the invention.

Referring to the drawing, the battery power supply system of the invention includes a primary battery and a secondary battery, each as hereinafter described.

The primary battery consists of a plurality of primary cells of the air depolarized type, having a high ampere hour capacity per unit of volume. Such cells usually employ zinc and carbon electrodes in a caustic electrolyte, and are characterized by a low self discharge per unit capacity. The primary cells are connected in series and in parallel as required. The number of primary cells which are connected in series is determined by the voltage required to maintain a voltage differential between the primary and secondary batteries. The number of cells which are connected in parallel is determined by the continuous rate of discharge and by the total ampere hours required for a given continuous period of operation.

The secondary battery consists of a plurality of lead-acid or similar type storage cells. The secondary battery cells are connected in series, and the number of cells is determined by the voltage required by the load. The ampere hour capacity of the secondary battery is preferably as low as possible, so as to minimize loss of energy due to local action. The capacity of the secondary battery should be no greater than is required to maintain a suitable degree of voltage regulation. For example, if the primary battery capacity is 2000 ampere hours, a secondary battery of 40 ampere hours capacity usually would be suitable.

The positive terminals of the primary and secondary batteries are connected to each other by each of several circuits, as hereinafter described, and the positive lead of the secondary battery is connected to the load thru a fuse.

The negative terminals of the primary and secondary batteries are connected directly to each other, and to the load thru the contacts of a relay which is identified as the load relay, the operation of which is hereinafter described.

The invention contemplates use of the apparatus shown in conjunction with timing means (not shown) whereby electric power is supplied to the load intermittently at time intervals of predetermined duration and spacing.

The negative terminals of the primary and secondary batteries are also connected to the coil of the load relay. The positive terminal of the secondary battery is connected to the coil of the load relay by a circuit which includes one of two movable contacts carried by the armature of a second relay which is identified as the voltage relay, the operation of which is hereinafter described.

The positive terminals of the primary and secondary batteries are connected to each other by a circuit which includes a switch, an ammeter, a ballast regulator, a variable resistor which is identified as variable resistor No. 1, and the other of the two movable contacts carried by the armature of the voltage relay.

The ballast regulator consists of a filament lamp, the resistance of which varies directly with current flow, and which serves to maintain within limits a constant rate of current flow between the primary and secondary batteries. This ballast is capable of maintaining a substantially constant rate of charge throughout the useful life of the primary cells, the voltage differential between the primary and secondary batteries being at a maximum at the beginning of the cycle and approaching zero at the end of the life of the primary cells.

A characteristic of the primary cells is that at the end of their useful life the voltage drops to about 1 volt per cell. Since the secondary cells usually have a working voltage of 2 volts per cell, twice as many series connected primary cells as secondary cells are required.

The ballast selected is such that the current supplied to the secondary battery from the primary battery equals the average current consumed by the load. Thus if the load is 20 amperes for 2.4 hours per day, on an intermittent basis, the rate of current continuously supplied from the primary battery would be 2 amperes plus the current lost by local action in the secondary battery.

Fine adjustments in charging rates may be made with variable resistor No. 1. The rate of charge is always selected so as not to exceed the permissible maximum rate for proper depolarization of the primary cells.

A degree of automatic regulation occurs also. If the rate of current supplied from the primary battery should, for instance, exceed slightly the average consumption of the load, the secondary battery voltage tends to rise. This in turn causes the consumption of the load to increase, increases the local action within the secondary battery, and reduces the charging rate due to decreased voltage differential.

A potentiometer of high resistance has one of its sides connected to the positive terminal of the secondary battery by a circuit which includes only the ammeter. The opposite side of the potentiometer is connected to the positive terminal of the secondary battery by a parallel circuit which includes, in addition to the ammeter, the ballast regulator and variable resistor No. 1. The last mentioned side of the potentiometer is connected also to the positive terminal of the primary battery by a circuit which includes the switch and the second movable contact carried by the armature of the voltage regulator.

The coil of the voltage relay has one of its leads connected to one side of the potentiometer, which is connected directly to the positive terminal of the secondary battery, as above described. The other lead of the coil of the voltage relay is connected to the potentiometer at an intermediate point, and to the positive terminal of the primary battery by a circuit which includes the switch and a reset button.

The voltage relay is responsive to voltage differences between the primary and secondary batteries. This relay is adjusted, by setting the potentiometer, so that it will be deenergized when the voltage difference between the primary and secondary batteries drops below a predetermined level.

The voltage relay is energized initially by closing the switch and pressing the reset button. Once energized, the voltage relay completes the charging circuit between the primary and secondary batteries, thru the ballast regulator and variable resistor No. 1, and at the same time completes a circuit, thru one of its contacts, whereby the relay remains energized. The voltage relay, upon being energized, also completes a circuit whereby the load relay is energized, and the load is connected to the secondary battery, as above described.

The positive terminals of the primary and secondary batteries are also connected by a circuit which includes, in addition to the switch and the ammeter, a second variable resistor which is identified as variable resistor No. 2. The resistance of this charging circuit is large with respect to the resistance thru the ballast regulator. Variable resistor No. 2 is adjusted so that the current passing thru this circuit is equal to the loss of current in the secondary battery due to local action.

The operation of the system is as follows:

The switch is closed, and the reset button is pressed. The voltage relay is now energized, and in turn the load relay. A current flows thru the ballast regulator which is approximately equal to the average of the intermittent load current. A current also flows thru variable resistor No. 2 which is approximately equal to the rate of self discharge of the secondary battery.

The power supply continues to deliver current to the fixed intermittent load until the voltage of the primary battery falls to nearly that of the secondary battery, which occurs near the end of the useful life of the primary cells. At this point the voltage relay is deenergized, disconnecting the charging circuit thru the ballast regulator, and also disconnecting the load by deenergizing the load relay.

The rate of discharge of the primary battery is now reduced to that necessary to make up the loss due to local action of the secondary battery. At the reduced rate of discharge the voltage of the primary battery will tend to increase slightly, thus insuring delivery of adequate current to the secondary battery. This action can continue for an extended period, until the primary battery is completely exhausted, and insures that the secondary battery will be maintained in a substantially fully charged state for an extended period, allowing ample time to replace the primary battery.

The arrangement above described prevents the secondary battery from continuing to discharge until exhausted, which possibly would result in permanent damage to the secondary battery as well as making it more susceptible to damage due to freezing.

It is only necessary to replace the primary battery to reactivate the power supply system of the invention.

An advantageous feature of the invention is that the rate of charge to the secondary battery is maintained at a constant level, well below the rate that would normally cause excessive gasing of the secondary battery. Loss of electrolyte is thus prevented.

The invention may be modified in various ways without departing from the spirit and scope thereof.

I claim:

1. The combination of a primary battery consisting of a plurality of cells of the air depolarized type each characterized by a high ampere hour capacity per unit of volume and a low self discharge rate per unit capacity, but having a comparatively low useful discharge rate, a secondary battery consisting of a plurality of cells each characterized by a high useful discharge rate but also having a comparatively high self discharge rate, the number and arrangement of the cells of the respective batteries being such that the primary battery has a substantially greater voltage and ampere hour capacity than the secondary battery, and a circuit connecting the primary and secondary batteries to each other whereby current is caused to flow from the primary battery to the secondary battery as necessary to maintain the secondary battery in fully charged condition, the circuit including resistance means capable of limiting the rate at which current is supplied to the secondary battery from the primary battery, and relay means responsive to voltage differences between the primary and secondary batteries and capable of interrupting the flow of current from the primary battery to the secondary battery when the voltage of the primary battery falls below a predetermined level.

2. The combination of a primary battery consisting of a plurality of cells of the air depolarized type each characterized by a high ampere hour capacity per unit of volume and a low self discharge rate per unit capacity, but having a comparatively low useful discharge rate, a secondary battery consisting of a plurality of cells each characterized by a high useful discharge rate but also having a comparatively high self discharge rate, the number and arrangement of the cells of the respective batteries being such that the primary battery has a substantially greater voltage and ampere hour capacity than the secondary battery, and a circuit connecting the primary and secondary batteries to each other whereby current is caused to flow from the primary battery to the secondary battery as necessary to maintain the secondary battery in fully charged condition, the circuit including relay means responsive to voltage differences between the primary and secondary batteries and capable of interrupting the flow of current from the secondary battery when the voltage of the primary battery falls below a predetermined level.

3. The combination of a primary battery consisting of a plurality of cells of the air depolarized type each characterized by a high ampere hour capacity per unit of volume and a low self discharge rate per unit capacity, but having a comparatively low useful discharge rate, a secondary battery consisting of a plurality of cells each characterized by a high useful discharge rate but also having a comparatively high self discharge rate, the number and arrangement of the cells of the respective batteries being such that the primary battery has a substantially greater voltage and ampere hour capacity than the secondary battery, and a pair of circuits each connecting the primary and secondary batteries to each other whereby current is caused to flow from the primary battery to the secondary battery as necessary to maintain the secondary battery in fully charged condition, one of the circuits including resistance means capable of limiting the rate at which current is supplied to the secondary battery from the primary battery to a predetermined rate corresponding approximately to the average consumption of current from the secondary battery and the other of the circuits including resistance means capable of limiting the rate at which current is supplied to the secondary battery from the primary battery to a predetermined rate corresponding approximately to the loss of current in the secondary battery due to local action, the first mentioned circuit also including relay means responsive to voltage differences between the primary and secondary batteries and capable of interrupting the flow of current from the primary battery to the secondary battery thru the first mentioned circuit when the voltage of the primary battery falls below a predetermined level.

References Cited in the file of this patent

UNITED STATES PATENTS 979,154   Gugler _____ Dec. 20, 1910